United States Patent [19]

Adachi et al.

[11] Patent Number: 5,430,606
[45] Date of Patent: Jul. 4, 1995

[54] DOUBLE LAYER CAPACITOR WITH HIGH CAPACITANCE CARBONACEOUS MATERIAL ELECTRODES

[75] Inventors: Kiyoshi Adachi, Kobe; Takeo Kurosaki, Osaka; Yoshinori Iwashima, Suita, all of Japan

[73] Assignee: Takeda Chemical Industries, Ltd., Osaka, Japan

[21] Appl. No.: 220,935

[22] Filed: Mar. 31, 1994

Related U.S. Application Data

[60] Continuation of Ser. No. 902,398, Jun. 17, 1992, abandoned, which is a division of Ser. No. 689,888, filed as PCT/JP91/00127, Feb. 1, 1991, abandoned.

[30] Foreign Application Priority Data

Feb. 9, 1990 [JP] Japan .................................. 2-029963

[51] Int. Cl.$^6$ .............................................. H01G 9/00
[52] U.S. Cl. ..................................... 361/502; 423/460; 252/502
[58] Field of Search .................... 361/502; 423/447.1, 423/460; 252/502; 502/427, 436, 437

[56] References Cited

U.S. PATENT DOCUMENTS

| | | | |
|---|---|---|---|
| 3,536,963 | 10/1970 | Boos | 361/502 |
| 4,458,022 | 7/1984 | Ohsaki et al. | 502/42 |
| 4,946,663 | 8/1990 | Audley et al. | 423/460 |
| 4,987,116 | 1/1991 | Karl et al. | 502/427 |
| 5,064,805 | 11/1991 | Otowa | 502/427 |

FOREIGN PATENT DOCUMENTS

| | | | |
|---|---|---|---|
| 0216599 | 4/1987 | European Pat. Off. | |
| 565699 | 2/1924 | France | |
| 3717802 | 6/1962 | Japan | 423/460 |
| 4734595 | 8/1972 | Japan | 252/502 |
| 1246677 | 6/1986 | Japan | 423/460 |
| 2200867 | 8/1990 | Japan | 423/460 |

*Primary Examiner*—Bruce A. Reynolds
*Assistant Examiner*—Michael D. Switzer
*Attorney, Agent, or Firm*—Wenderoth, Lind & Ponack

[57] ABSTRACT

A double layer capacitor with electrodes produced from a carbonaceous material having a large capacitance obtained by heat-treating an activated carbon precursor at a temperature below 700° C., preferably from 400° to 500° C., in an alkali metal hydroxide bath. In particular, its capacitance per unit volume is several times larger, in some cases 7 or more times larger, as compared with conventional activated carbons for capacitors.

1 Claim, No Drawings

DOUBLE LAYER CAPACITOR WITH HIGH CAPACITANCE CARBONACEOUS MATERIAL ELECTRODES

This application is a continuation of now abandoned application, Ser. No. 07/902,398, filed Jun. 17, 1992, which is a division of now abandoned application Ser. No. 07/689,888, filed as PCT/JP91/00127, Feb. 1, 1991.

This invention relates to a carbonaceous material usable in manufacturing polarizable electrodes of electric double layer capacitors and to a method of producing said material.

BACKGROUND ART

In recent years, microcomputers and IC memories are widely used in electronic devices and in precision machines or instruments. However, they are vulnerable even to a momentary suspension of electric current, resulting in faulty operations or data erasure, for instance. For this reason, these devices and so forth generally have, as a backup power source, a small-sized capacitor in which an electric double layer is utilized. In such electric double layer capacitors, there has been used activated carbon which is electrochemically inert and has a large specific surface area. However, the conventional grades of activated carbon used for such purposes have a capacitance (electrostatic capacity) of at most about 60 F/g or, when expressed on a per-unit-volume basis, about 40 F/cm$^3$ and are not fully satisfactory in this respect. Japanese Kokai Tokkyo Koho (published unexamined patent application) No. 63-78514 describes the use of an activated carbon species derived from petroleum coke and having a specific surface area of 2,000 to 3,500 m$^2$/g in manufacturing polarizable electrodes of electric double layer capacitors. However, this activated carbon is not fully satisfactory as yet from the viewpoint of capacitance, in particular capacitance per unit volume.

DISCLOSURE OF INVENTION

The object of the invention is to provide a carbonaceous material having a large capacitance and, in particular, capable of storing high energy per unit volume so that small-sized capacitors with increased capacity can be fabricated therewith.

The present invention consists in a high capacitance carbonaceous material obtained by heat-treating an activated carbon precursor at a temperature below 700° C. in an alkali metal hydroxide bath.

The high capacitance carbonaceous material according to the invention can be produced by heat-treating an activated carbon precursor at a temperature below 700° C. in an alkali metal hydroxide bath.

The activated carbon precursor mentioned above may be any carbonaceous material generally used for the manufacture of activated carbon. As examples, there may be mentioned coconut shells, wood flour or sawdust, coal and resins. These may be uncarbonized or carbonized. For producing carbonaceous materials with a large capacitance per unit volume, coconut shells, wood flour and coal are preferred and coconut shells are most preferred. As a high capacitance carbonaceous material, one having both a small internal resistance and little degradation of capacitance with the lapse of time is preferable. Taking the foregoing into consideration, we consider that coal is preferable.

When the activated carbon precursor is in uncarbonized state, said precursor may be heat-treated in an alkali metal hydroxide bath. It is preferable, however, that said precursor be carbonized in advance. The carbonization temperature is generally 400°–950° C. For producing carbonaceous materials having a high capacitance per unit volume, said temperature should preferably within the range of 400°–800° C., more preferably 400°–750° C. and most preferably 400°–700°C. Carbonization temperatures exceeding 950° C. will fail to give high capacitance carbonaceous materials. Conversely, when the carbonization temperature is below 400° C., the carbonization product obtained will contain volatile matter in a large amount, involving the risk of dangerous swelling of the alkali metal hydroxide as resulting from generation of a large amount of volatile matter in the subsequent heat-treatment step. Taking a degradation of capacitance with the lapse of time as well as an internal resistance in addition to a capacitance into consideration, we consider that the carbonization temperature is preferably 800°–950° C. This carbonization treatment can be carried out within the above temperature range in the same manner as in the conventional activated carbon production. Thus, for example, it is generally recommended that the temperature be raised from room temperature to a predetermined temperature within the range of 400–800° C. at a temperature elevation rate of about 20° C. per minute. The treatment at 400–800° C. is conducted generally for a period of about 10 minutes to 2 hours. As the above-mentioned alkali metal hydroxide, there may be mentioned the hydroxides of sodium, potassium, cesium and lithium, among others. For producing high capacitance carbonaceous materials, however, sodium hydroxide and potassium hydroxide are preferred and sodium hydroxide is particularly preferred. The alkali metal hydroxide is used generally in an amount of at least 2 parts, preferably 3–7 parts, more preferably 4–6 parts, per part of the activated carbon precursor on the dry weight basis. When said hydroxide is used in smaller amounts, the final carbonaceous materials produced may show fluctuations in their performance characteristics. Conversely, the use of an alkali metal hydroxide in an excessively large amount is meaningless from the technological viewpoint and rather uneconomical from the commercial viewpoint, although the performance characteristics of the carbonaceous material produced are not affected thereby.

In heat-treating the activated carbon precursor in an alkali metal hydroxide bath, the activated carbon precursor and the alkali metal hydroxide in solid form are mixed up and the mixture is heated or, alternatively, the alkali metal hydroxide in a molten state or in the form of a solution is admixed with the activated carbon precursor and the mixture is heated. When an aqueous solution is used for admixing, it is recommended that the moisture be first evaporated off and the dried mixture be then subjected to heat treatment.

The temperature for the above-mentioned heat treatment is generally not lower than 400° C. but lower than 700° C. Taking a degradation of capacitance with the lapse of time and an internal resistance in addition to a capacitance into consideration, we consider that the temperature for the above-mentioned heat treatment is preferably 400°–500° C. The carbonaceous material produced at a higher heat treatment temperature will have a larger surface area. At temperatures exceeding 600° C., however, the capacitance will decrease with the temperature. When the heat treatment is carried out at a temperature below 400° C., the viscosity of the molten alkali metal hydroxide is high and this makes the contact with the activated carbon precursor insufficient, causing a decrease in the capacitance of the carbonaceous material produced. When sodium hydroxide or potassium hydroxide is used as the alkali metal hydroxide and the heat treatment temperature is elevated, a critical increase in capacitance is found in the vicinity of 500° C. and 450° C. This heat treatment is recommendably effected, for example by gradually raising the temperature from room temperature to 400° C. generally at a temperature elevation rate of about 20° C. per minute, then maintaining that temperature for about 30 minutes and then gradually raising the temperature to a predetermined level at a rate of about 20° C. per minute. The time required for the heat treatment at 400°–750° C. is generally about 10 minutes to 2 hours.

The alkali metal portion is then removed by washing with water and the thus-obtained solid matter is dried and crushed to give a carbonaceous material.

The thus-produced carbonaceous material according to the invention has a great capacitance and can be used in the manufacture of polarizable capacitor electrodes and battery electrodes, for instance.

Polarizable capacitor electrodes can be manufactured using the carbonaceous material according to the invention by any conventional method known in the art. Thus, for example, the carbonaceous material, a binder and water are mixed in a blender or kneader. The paste-like mixture obtained is then molded into a sheet with a thickness of 0.6 mm, for instance. This sheet-like raw material for electrodes is cut into disks, e.g. 15 mm in diameter and 0.6 mm in thickness. Two disks, together with a separator sandwiched therebetween, are placed in a can or the like container, e.g. 20 mm in diameter and 2.0 mm in thickness, and then an electrolyte solution is poured into the container. In this manner, electric double layer capacitor unit cells can be obtained.

BEST MODE FOR CARRYING OUT THE INVENTION

The following examples illustrate the invention in further detail.

EXAMPLE 1

Coconut shells were carbonized by heating at 400°–900° C. for 1 hour. Five weights of sodium hydroxide was added to the carbonization product. The mixture was heated in a nitrogen stream from room temperature to 550° C. at a temperature elevation rate of 20° C. per minute and then maintained at that temperature for 30 minutes. This was washed with warm water for removing the alkali, then dried and crushed to give a powdery carbonaceous material. Some typical physical properties of the material are shown in Table 1.

TABLE 1

| Run No. | Carbonization temperature °C. | Capacitance F/g | Apparent density g/cm³ | Capacitance F/cm³ | BET surface area m²/g |
|---|---|---|---|---|---|
| 1-1 | From raw material | 143 | 0.389 | 56 | 1726 |
| 1-2 | 400 | 394 | 0.451 | 178 | 1665 |
| 1-3 | 450 | 398 | 0.468 | 186 | 1534 |
| 1-4 | 500 | 449 | 0.490 | 220 | 1499 |
| 1-5 | 550 | 563 | 0.513 | 289 | 1444 |
| 1-6 | 600 | 477 | 0.562 | 268 | 1307 |
| 1-7 | 650 | 402 | 0.650 | 261 | 1135 |
| 1-8 | 700 | 313 | 0.682 | 213 | 863 |

TABLE 1-continued

| Run No. | Carbonization temperature °C. | Capacitance F/g | Apparent density g/cm³ | Capacitance F/cm³ | BET surface area m²/g |
|---|---|---|---|---|---|
| 1-9 | 750 | 171 | 0.705 | 121 | 665 |
| 1-10 | 800 | 120 | 0.720 | 86 | 580 |
| 1-11 | 850 | 64 | 0.731 | 47 | 472 |
| 1-12 | 900 | 51 | 0.734 | 37 | 312 |

EXAMPLE 2

Coconut shells were carbonized by heating at 650° C. for 1 hour. Five weights of sodium hydroxide was added to the carbonization product. The mixture was heated in a nitrogen stream from room temperature to a temperature specified in Table 2 at a temperature elevation rate of 20° C. per minute and maintained at that temperature for 30 minutes. The mixture thus heat-treated was washed with warm water for removing the alkali, dried and crushed to give a powdery carbonaceous material. Some typical physical properties of the material are shown in Table 2.

TABLE 2

| Run No. | Heat treatment temperature °C. | Capacitance F/g | Apparent density g/cm³ | Capacitance F/cm³ | BET surface area m²/g |
|---|---|---|---|---|---|
| 2-1 | 350 | 1 | 0.691 | 1 | 253 |
| 2-2 | 400 | 58 | 0.685 | 40 | 370 |
| 2-3 | 450 | 70 | 0.672 | 47 | 457 |
| 2-4 | 500 | 131 | 0.661 | 88 | 649 |
| 2-5 | 550 | 402 | 0.650 | 261 | 1150 |
| 2-6 | 600 | 362 | 0.424 | 153 | 1722 |
| 2-7 | 650 | 301 | 0.388 | 116 | 1813 |
| 2-8 | 700 | 198 | 0.362 | 72 | 1950 |
| 2-9 | 750 | 130 | 0.330 | 43 | 2001 |
| 2-10 | 800 | 53 | 0.280 | 15 | 2337 |

Coconut shells were carbonized by heating at 650° C. for 1 hour. Five weights of potassium hydroxide was added to the carbonization product. The mixture was heated in a nitrogen stream from room temperature to a temperature specified in Table 3 at a temperature elevation rate of 20° C. per minute, heat-treated at that temperature for 30 minutes, then washed with warm water for removing the alkali, dried and crushed to give a powdery carbonaceous material. Some typical physical properties of the material are shown in Table 3.

TABLE 3

| Run No. | Heat treatment temperature °C. | Capacitance F/g | Apparent density g/cm³ | Capacitance F/cm³ |
|---|---|---|---|---|
| 2-11 | 400 | 86 | 0.635 | 55 |
| 2-12 | 450 | 220 | 0.595 | 130 |
| 2-13 | 500 | 201 | 0.503 | 101 |

EXAMPLE 3

Coconut shells, wood flour, coal and a phenol resin were used as raw materials for activated carbon. Each raw material was carbonized by heating at 650° C. for 1 hour. Five weights of sodium hydroxide was added to the carbonization product and the mixture was heated in a nitrogen stream from room temperature to 550° C. at a temperature elevation rate of 20° C. per minute, heat-treated at that temperature for 30 minutes, washed with warm water for removing the alkali, then dried and crushed to give a powdery carbonaceous material.

Some typical physical properties of the materials thus produced are shown in Table 4.

TABLE 4

| Run No. | Raw material | Capacitance F/g | Apparent density g/cm³ | Capacitance F/cm³ | BET surface area m²/g |
|---|---|---|---|---|---|
| 3-1 | Coconut shells | 402 | 0.650 | 261 | 1150 |
| 3-2 | Wood flour | 381 | 0.421 | 160 | 1470 |
| 3-3 | Coal | 256 | 0.682 | 175 | 885 |
| 3-4 | Resin | 166 | 0.705 | 117 | 704 |

EXAMPLE 4

Coconut shells were carbonized at 650° C. for one hour. One to ten weights of sodium hydroxide was added to the carbonization product. The mixture was heated in a nitrogen stream from room temperature to 550° C. at a temperature elevation rate of 20° C. per minute and heat-treated at that temperature for 30 minutes, then washed with warm water for removing the alkali, dried and crushed to give a powdery carbonaceous material. Some typical physical properties of the materials thus produced are shown in Table 5.

TABLE 5

| Run No. | Amount of NaOH (times) | Capacitance F/g | Apparent density g/cm³ | Capacitance F/cm³ |
|---|---|---|---|---|
| 4-1 | 1 | 60 | 0.671 | 40 |
| 4-2 | 2 | 153 | 0.668 | 102 |
| 4-3 | 3 | 215 | 0.660 | 142 |
| 4-4 | 4 | 399 | 0.653 | 260 |
| 4-5 | 5 | 402 | 0.650 | 261 |
| 4-6 | 6 | 391 | 0.651 | 255 |
| 4-7 | 7 | 41 | 0.646 | 265 |
| 4-8 | 8 | 396 | 0.651 | 258 |
| 4-9 | 9 | 401 | 0.649 | 260 |
| 4-10 | 10 | 395 | 0.651 | 257 |

EXAMPLE 5

Coconut shells were carbonized by heating at 650° C. for 1 hour. Five weights of sodium hydroxide was added to the carbonization product. The mixture was heated in a nitrogen stream from room temperature to 550° C. at a temperature elevation rate of 20° C. per minute and heat-treated at that temperature for 30 minutes, then washed with warm water for removing the alkali, dried and crushed to give a powdery carbonaceous material. Some typical physical properties of the materials thus produced are shown in Table 6.

TABLE 6

| Run No. | Alkali metal hydroxide | Capacitance F/g | Apparent density g/cm³ | Capacitance F/cm³ |
|---|---|---|---|---|
| 5-1 | LiOH | 88 | 0.663 | 58 |
| 5-2 | NaOH | 402 | 0.650 | 261 |
| 5-3 | KOH | 149 | 0.441 | 66 |
| 5-4 | CsOH | 108 | 0.580 | 63 |

EXAMPLE 6

Coconut shells were carbonized by heating at 400°–1000° C. for 1 hour. Five weights of sodium hydroxide was added to the carbonization product. The mixture was heated in a nitrogen stream from room temperature to 450° C. at a temperature elevation rate of 20° C. per minute and then maintained at that temperature for 3 hours. This was washed with warm water for removing the alkali, then dried and crushed to give a powdery carbonaceous material. Some typical physical properies of the material are shown in Table 7.

TABLE 7

| Run No. | Carbonization temperature °C. | Capacitance F/g | Apparent density g/cm³ | Capacitance F/cm³ | BET surface area m²/g | Internal Resistance |
|---|---|---|---|---|---|---|
| 6-1 | From raw material | 150 | 0.435 | 65 | 1700 | 1.76 |
| 6-2 | 400 | 405 | 0.470 | 190 | 1614 | 1.76 |
| 6-3 | 450 | 425 | 0.481 | 204 | 1550 | 1.75 |
| 6-4 | 500 | 488 | 0.490 | 239 | 1510 | 1.38 |
| 6-5 | 550 | 560 | 0.485 | 271 | 1515 | 1.01 |
| 6-6 | 600 | 525 | 0.530 | 278 | 1420 | 0.70 |
| 6-7 | 650 | 462 | 0.585 | 270 | 1210 | 0.56 |
| 6-8 | 700 | 362 | 0.631 | 228 | 1002 | 0.40 |
| 6-9 | 750 | 281 | 0.665 | 187 | 865 | 0.22 |
| 6-10 | 800 | 185 | 0.685 | 127 | 692 | 0.14 |
| 6-11 | 850 | 136 | 0.700 | 96 | 611 | 0.12 |
| 6-12 | 900 | 96 | 0.710 | 68 | 553 | 0.09 |
| 6-13 | 950 | 84 | 0.715 | 60 | 545 | 0.07 |
| 6-14 | 1000 | 58 | 0.730 | 42 | 501 | 0.07 |

We claim:

1. An electric double layer capacitor unit cell having, as a polarizable electrode, carbonaceous material obtained by heat-treating in sodium hydroxide at a temperature of 400° to 500° C. an activated carbon precursor which is one having been subjected to carbonization treatment of 800° to 950° C.

* * * * *